Patented Mar. 17, 1953

2,631,943

UNITED STATES PATENT OFFICE 2,631,943

PROCESS FOR THE MANUFACTURE OF A PULVERULENT ALKYL CELLULOSE COATED UPON A PULVERULENT CARRIER

Max Matter, Basel, Switzerland, assignor to Ciba Limited, Basel, Switzerland

No Drawing. Application August 13, 1948, Serial No. 44,220. In Switzerland August 15, 1947

3 Claims. (Cl. 106—193)

Alkyl-celluloses are produced by the known commercial processes in a bulky fibrous form only. Such products cannot be converted into a finely pulverulent form by grinding in grinding apparatus of the usual kind with or without the addition of extenders.

According to the present invention alkyl-celluloses, which are soluble in cold water and insoluble in hot water, are obtained in a finely pulverulent form by grinding an alkyl-cellulose which has been precipitated onto a finely pulverulent water-insoluble carrier from an aqueous solution of the alkyl-cellulose by heating the cold solution in the presence of the carrier and then dried.

As starting materials there may be used the usual commercial alkyl-celluloses which are soluble in cold water and insoluble in hot water, for example, ethyl-celluloses and especially methyl-celluloses.

As carriers there may be used water-insoluble inorganic or organic substances in a finely pulverulent form which are infusible at the temperature of the precipitation and the drying ranging from about 70° C. to 100° C. The most appropriate degree of fineness is that which permits them to be passed through a sieve having 24 meshes per cm. Such carriers are, for example, chalk, kieselguhr, sulfur, lead arsenate, copper oxychloride, dinitrocarbazole, dinitrothiocyanobenzene and advantageously kaolin.

The dried alkyl-celluloses are very hard brittle masses which can be ground without difficulty and without further treatment to a fine powder in a suitable mill. The degree of fineness depends solely on the efficiency of the mill.

The finely pulverized products are excellently suited for incorporation in pulverulent preparations for the protection of plants. The capacity for suspension and surface-active properties of spraying liquors prepared with the products of the invention are considerably improved by such an addition. Dusting preparations and preparations for dressing seeds, which contain alkyl-celluloses prepared in accordance with the invention, are also distinguished by improved physico-chemical properties.

The following examples illustrate the invention, the parts being by weight unless otherwise stated and the relationship of parts by weight to parts by volume being the same as that of the kilogram to the liter:

Example 1

5 parts of methyl-cellulose (2 grams of which dissolved in 100 grams of water produce a viscosity of 2250 centipoises at 18° C.) in 90 parts of water are slowly introduced at 70–80° C. into a kneading machine, for example, of the Werner-Pfleiderer type. After kneading has been carried on for ½ hour at 70–80° C., the mixture is cooled to 10–15° C. by external cooling, whereby a viscous solution is formed. 20 parts of finely powdered kaolin are then introduced. When a homogeneous mass has been obtained by prolonged kneading in the cold, the mass is raised by external heating to 90–100° C. and kneaded, whereby the methyl-cellulose is precipitated onto the carrier, and then the mass is dried by continued heating at 90–100° C.

The dry colorless product so obtained is then broken up and can be converted into a fine powder by grinding. By using an impact mill designed for fine grinding a powder is obtained of which more than 99 per cent can pass through a sieve of 24 per centimeter mesh. Upon treatment with 10 times its weight of water the new product yields a viscous white suspension.

Instead of kaolin, there may be used as the carrier any of the other water-insoluble substances named in the opening part of this specification.

Example 2

200 parts by volume of water are heated up to 75–80° C. in a wooden stirring vessel of a capacity of 500 parts by volume, and then 4 parts of methyl-cellulose of a viscosity of 4000 centipoises are strewn into the water. The mixture is allowed to cool, whereby the methyl-cellulose dissolves, and then 16 parts of finely powdered copper oxychloride are introduced, and the whole is heated to 80° C., whereby the methyl-cellulose is precipitated upon the copper oxychloride. The hot material is filtered through a preheated filter, and the product is dried at 100–120° C. and finely ground.

What is claimed is:

1. A process for the manufacture of a finely pulverulent mixture of an alkyl-cellulose, which is a member selected from the group consisting of methyl cellulose and ethyl cellulose and which is soluble in cold water and insoluble in hot water, and a finely pulverulent water-insoluble carrier, which comprises dissolving the alkyl-cellulose in cold water, then precipitating the alkyl-cellulose onto the finely pulverulent carrier by heating the cold solution after the introduction of the finely pulverulent carrier thereinto, drying the product thus obtained and grinding the same.

2. A process for the manufacture of a finely pulverulent mixture of a methyl-cellulose which is soluble in cold water and insoluble in hot water, and a finely pulverulent water-insoluble carrier, which comprises dissolving the methyl-cellulose in cold water, then precipitating the methyl-cellulose onto the finely pulverulent carrier by heating the cold solution after the introduction of the finely pulverulent carrier thereinto, drying the product thus obtained and grinding the same.

3. A process for the manufacture of a finely pulverulent mixture of a methyl-cellulose which is soluble in cold water and insoluble in hot water, and finely-pulverulent kaolin, which comprises dissolving the methyl-cellulose in cold water, precipitating the methyl-cellulose onto the finely pulverulent kaolin by heating the cold solution after the introduction of the finely pulverulent kaolin thereinto, drying the product thus obtained and grinding the same.

MAX MATTER.

REFERENCES CITED

The following references are of record in the file of this patent:

UNITED STATES PATENTS

| Number | Name | Date |
| --- | --- | --- |
| 1,982,778 | Anderson | Dec. 4, 1934 |
| 2,009,600 | Ximeney | July 30, 1935 |
| 2,056,795 | Macht et al. | Oct. 6, 1936 |
| 2,108,582 | Dunham | Feb. 15, 1938 |
| 2,331,864 | Swinehart et al. | Oct. 12, 1943 |
| 2,331,865 | Swinehart et al. | Oct. 12, 1943 |

FOREIGN PATENTS

| Number | Country | Date |
| --- | --- | --- |
| 499,284 | Great Britain | Jan. 20, 1939 |

OTHER REFERENCES

Ott-Cellulose and Cellulose Derivatives, page 790, Inter-Science Publishers, Inc., New York, 1943.

Heuser, "Cellulose Chemistry" (1944), pages 400 to 405.